United States Patent
Goodman

(10) Patent No.: US 10,916,802 B1
(45) Date of Patent: Feb. 9, 2021

(54) IONIC CONDUCTIVITY IN SILICON ELECTROLYTE COMPOSITE PARTICLES

(71) Applicant: Nanostar Inc., New Orleans, LA (US)

(72) Inventor: Jonathan Goodman, Evanston, IL (US)

(73) Assignee: NANOSTAR INC., New Orleans, LA (US)

( * ) Notice: Subject to any disclaimer, the term of this patent is extended or adjusted under 35 U.S.C. 154(b) by 0 days.

(21) Appl. No.: 16/983,433

(22) Filed: Aug. 3, 2020

Related U.S. Application Data

(60) Provisional application No. 63/017,425, filed on Apr. 29, 2020.

(51) Int. Cl.

| | |
|---|---|
| *H01M 4/1395* | (2010.01) |
| *H01M 4/134* | (2010.01) |
| *H01M 10/0525* | (2010.01) |
| *H01M 4/38* | (2006.01) |
| *H01M 4/62* | (2006.01) |
| *H01M 10/0562* | (2010.01) |
| *H01M 4/02* | (2006.01) |

(52) U.S. Cl.
CPC ....... *H01M 10/0562* (2013.01); *H01M 4/134* (2013.01); *H01M 4/1395* (2013.01); *H01M 4/386* (2013.01); *H01M 4/62* (2013.01); *H01M 4/625* (2013.01); *H01M 10/0525* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 8,871,391 | B2 | 10/2014 | Liang et al. |
| 8,889,295 | B2 | 11/2014 | Yushin et al. |
| 9,373,838 | B2 | 6/2016 | Yushin et al. |
| 9,673,448 | B2 | 6/2017 | Yushin et al. |
| 9,899,702 | B2 | 2/2018 | Miyashita et al. |
| 10,147,950 | B2 | 12/2018 | Sakshaug et al. |
| 10,195,583 | B2 | 2/2019 | Costantino et al. |
| 10,454,103 | B2 | 10/2019 | Sakshaug et al. |
| 10,461,320 | B1 | 10/2019 | Xue et al. |
| 10,461,325 | B1 | 10/2019 | Xue et al. |
| 10,476,071 | B2 | 11/2019 | Yushin et al. |
| 10,581,066 | B2 | 3/2020 | Guo et al. |
| 10,590,277 | B2 | 3/2020 | Costantino et al. |
| 10,608,240 | B1 | 3/2020 | Xue et al. |
| 2018/0083303 | A1 | 3/2018 | Platt et al. |
| 2018/0145316 | A1 | 5/2018 | Moon et al. |
| 2019/0165357 | A1* | 5/2019 | Senoue ................ H01M 4/134 |
| 2019/0312304 | A1 | 10/2019 | Uesugi et al. |
| 2020/0127325 | A1 | 4/2020 | Takahashi et al. |

FOREIGN PATENT DOCUMENTS

| | | |
|---|---|---|
| WO | 2018183365 A1 | 10/2018 |
| WO | 2019051305 A1 | 3/2019 |

\* cited by examiner

*Primary Examiner* — Haroon S. Sheikh

(57) ABSTRACT

Processes for the manufacture of porous particulates for use in lithium ion batteries are described. The porous materials include silicon active materials carried in a continuous matrix that includes a carbon phase and a solid-electrolyte phase.

23 Claims, No Drawings

IONIC CONDUCTIVITY IN SILICON ELECTROLYTE COMPOSITE PARTICLES

CROSS-REFERENCE TO RELATED APPLICATIONS

This disclosure claims the benefit of priority to U.S. Patent Application No. 63/017,425, filed 29 Apr. 2020, the entirety of which are incorporated herein.

FIELD OF THE INVENTION

Embodiments of the present invention relate to the preparation of porous particles which include anode-active nanoparticles and solid electrolytic materials and their use in anodes in lithium ion batteries.

BACKGROUND

Lithium-ion ($Li^+$) secondary or rechargeable batteries are now the most widely used secondary battery systems for portable electronic devices. However, the growth in power and energy densities for lithium ion battery technology has stagnated in recent years as materials that exhibit both high capacities and safe, stable cycling have been slow to be developed. Much of the current research effort for the next generation of higher energy capacity materials has revolved around using small or nanoparticulate active material bound together with conductive agents and carbonaceous binders.

There is a current and growing need for higher power and energy density battery systems. The power requirements for small scale devices such as microelectromechanical systems (MEMS), small dimensional sensor systems, and integrated on-chip microelectronics exceed the power densities of current $Li^+$ based energy storage systems. Power densities of at least 1 $J/mm^2$ are desired for effective function for such systems, and current energy densities for $Li^+$ thin film battery systems are about 0.02 $J/mm^2$. Three dimensional architectures for battery design can improve the areal power density of $Li^+$ secondary batteries by packing more active material per unit area without employing thicker films that are subject to excessive cycling fatigue. Three-dimensional Lithium-ion battery architectures also increase lithium ion diffusion by maximizing the surface area to volume ratio and by reducing diffusion lengths.

The current state-of-the-art for anode electrodes in lithium ion batteries includes the use of high surface area carbon materials. However, the capacity of any graphitic carbon, carbon black, or other carbonaceous material is limited to a theoretical maximum of 372 mAh/g and about 300 mAh/g in practice because carbon electrodes are usually formed of carbon particles mixed with a polymeric binder pressed together to form a bulk electrode. To store charge, $Li^+$ intercalates between the planes of $sp^2$ carbon atoms and this C—$Li^+$—C moiety is reduced. In addition, the maximum number of $Li^+$ that can be stored is one per every six carbon atoms ($LiC_6$). While the capacity of graphitic carbon is not terribly high, the intercalation process preserves the crystal structure of the graphitic carbon, and so cycle life can be very good.

A more recent and promising option for anode materials is silicon (Si). In contrast to the intercalative charge storage observed in graphite, Si forms an alloy with lithium. Silicon-based negative electrodes are attractive because their high theoretical specific capacity of about 4200 mAh/g, which far exceeds than that of carbon, and is second only to pure Li metal. This high capacity comes from the conversion of the Si electrode to a lithium silicide which at its maximum capacity has a formula of $Li_{22}Si_6$, storing over 25 times more Li per atom than carbon. The large influx of atoms upon alloying, however, causes volumetric expansion of the Si electrode of over 400%. This expansion causes strain in the electrode, and this strain is released by formation of fractures and eventual electrode failure. Repeated cycling between $Li_xSi_y$ and Si thus causes crumbling of the electrode and loss of interconnectivity of the material. For example, 1 μm thick Si film anodes have displayed short cyclability windows, with a precipitously capacity drop after only 20 cycles. Accordingly, new structures for silicon compositions and methods for their manufacture are needed to support these anodic materials.

SUMMARY

A first embodiment is a porous microparticulate that includes about 5 wt. % to about 80 wt. % (dry basis) of a carbon matrix, about 5 wt. % to about 50 wt. % (dry basis) of a plurality of solid-electrolyte nanoparticles, and about 5 wt. % to about 90 wt. % (dry basis) of a plurality of silicon nanoparticles; wherein the porous microparticulate has an average diameter of about 1 μm to about 100 μm.

A second embodiment is a process of preparing a porous particulate for use in a lithium ion battery, the process includes providing a porous microparticulate, having an average diameter of about 1 μm to about 100 μm, and including about 5 wt. % to about 80 wt. % (dry basis) of a carbon matrix, about 5 wt. % to about 50 wt. % (dry basis) of a plurality of solid-sulfide-electrolyte nanoparticles, and about 5 wt. % to about 90 wt. % (dry basis) of a plurality of silicon nanoparticles; and then admixing the porous microparticulate with a polysulfide solution thereby interconnecting the solid-sulfide-electrolyte nanoparticles and forming a solid-electrolyte phase.

A third embodiment is a process of preparing a porous particulate for use in a lithium ion battery, the process includes providing a porous microparticulate, having an average diameter of about 1 μm to about 100 μm, and including about 5 wt. % to about 80 wt. % (dry basis) of a carbon matrix, about 5 wt. % to about 50 wt. % (dry basis) of a plurality of solid-sulfide-electrolyte nanoparticles, and about 5 wt. % to about 90 wt. % (dry basis) of a plurality of silicon nanoparticles; and then admixing the porous microparticulate with a sulfur solution thereby interconnecting the solid-sulfide-electrolyte nanoparticles and forming a solid-electrolyte phase.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

Herein are described processes for making porous particulates for use in lithium ion batteries. The porous particulates can include a porous heterogeneous matrix and a plurality of silicon nanoparticles. The porous heterogeneous matrix can include, consist essentially of, or consists of a carbon phase, a solid-electrolyte phase, and a plurality of pores. The plurality of silicon nanoparticles are preferably carried by and embedded in the porous heterogeneous matrix while being adjacent to the plurality of pores.

In a preferable instance, the porous particulate has a particle electrical conductivity in a range of about $10^{-4}$ to about $10^5$ S/cm, about $10^{-3}$ to about $10^5$ S/cm, about $10^{-2}$ to about $10^5$ S/cm, about $10^{-3}$ to about $10^4$ S/cm, about $10^{-3}$ to about $10^3$ S/cm, about $10^{-2}$ to about $10^5$ S/cm, about 0.1 to about $10^5$ S/cm, or about 1 to about $10^5$ S/cm. Still further, the porous particulate, preferably, has a particle ionic conductivity in a range of about $10^{-6}$ to about $10^{-1}$ S/cm, about $10^{-5}$ to about $10^{-1}$ S/cm, about $10^{-4}$ to about $10^{-1}$ S/cm, or about $10^{-3}$ to about $10^{-1}$ S/cm. More preferably the particle ionic conductivity is greater than about $10^{-5}$, about $10^{-4}$, about $10^{-3}$, of about $10^{-2}$ S/cm.

In one instance, the solid-electrolyte phase of the carbon matrix provides a lithium ion pathway from a surface of the particulate to the plurality of silicon nanoparticles. That is, the solid-electrolyte reduces the resistivity and/or improves the ionic conduction from the surface of the particulate to the silicon nanoparticles. In one example, the solid-electrolyte phase includes ion channels. In another example, the solid-electrolyte phase includes cation-anion pairs.

The solid-electrolyte phase can be embedded in the carbon phase and/or adjacent to the carbon phase and/or affixed to the carbon phase. In a preferable instance, the solid-electrolyte phase is embedded in and affixed to the carbon phase. Herewith, the solid-electrolyte phase can be affixed to the carbon phase by chemical bonding. Preferably, the silicon nanoparticles are adjacent to the solid-electrolyte phase. More preferably, the silicon nanoparticles are ionically connected to the solid-electrolyte phase. Even more preferably, the solid-electrolyte phase and the silicon nanoparticles are in sufficient contact that lithium ions can flow between the solid-electrolyte phase and the silicon nanoparticles. Herewith, sufficient contact means that the interfacial resistance to ion transfer is less than about 100, 50, 25, 10 5, or 1 Ohm/cm$^2$.

In one instance, the carbon phase includes, consists essentially of, or consist of reduced carbon. In one example, the carbon phase can be a soft carbon; in another example, the carbon phase can be a hard carbon. In still another example, the carbon phase is an admixture of soft and hard carbon. Preferably, the carbon phase is electronically conductive; that is, the carbon phase conducts electrons to and from the silicon nanoparticles carried within the porous particulate to a surface of the porous particulate. In a particulate instance, the carbon phase can have an electrical conductivity in a range of about $10^{-4}$ to about $10^5$ S/cm, about $10^{-3}$ to about $10^5$ S/cm, about $10^{-2}$ to about $10^5$ S/cm, about $10^{-3}$ to about $10^4$ S/cm, about $10^{-3}$ to about $10^3$ S/cm, about $10^{-2}$ to about $10^5$ S/cm, about 0.1 to about $10^5$ S/cm, or about 1 to about $10^5$ S/cm.

In another instance, the porous particulate can further include a conductive carbon. The conductive carbon can be selected from carbon nanotubes, carbon nanofibers, C65, C45, graphene, graphene oxide, reduced graphene oxide, mesocarbon microbeads, or a mixture thereof. Specific examples include Super P (e.g., MTI), Super C65 (e.g., IMERY), Super C45 (e.g., IMERY), TIMREX KS6 (e.g., MTI), and KS6L (e.g., IMERY). Preferably, the porous particulate includes about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, or 10 wt. % of the conductive carbon. In certain instances, the conductive carbon is embedded in, adhered to, and/or affixed to the carbon phase and this admixture of conductive carbon and the carbon phase has an electrical conductivity in a range of about $10^{-4}$ to about $10^5$ S/cm, about $10^{-3}$ to about $10^5$ S/cm, about $10^{-2}$ to about $10^5$ S/cm, about $10^{-3}$ to about $10^4$ S/cm, about $10^{-3}$ to about $10^3$ S/cm, about $10^{-2}$ to about $10^5$ S/cm, about 0.1 to about $10^5$ S/cm, or about 1 to about $10^5$ S/cm.

The silicon nanoparticles, preferably, include greater than about 70 wt. %, 75 wt. %, 80 wt. %, 85 wt. %, 90 wt. %, about 95 wt. %, about 98 wt. %, about 99 wt. %, about 99.5 wt. %, or about 99.9 wt. % silicon. In one instance, the silicon nanoparticles consist essentially of silicon. In another instance, the amorphous silicon nanoparticles consist of silicon. In one example, the amorphous silicon nanoparticles include amorphous hydrogenated silicon (a-Si:H). In another example, the amorphous silicon nanoparticles include n-doped or p-doped silicon.

In yet another example, the silicon nanoparticles include a silicon alloy. The silicon alloy can be a binary alloy (silicon plus one alloying element), can be a tertiary alloy, or can include a plurality of alloying elements. The silicon alloy is understood to include a majority silicon. A majority silicon means that the nanoparticles have a weight percentage that is greater than about 50% (50 wt. %) silicon, preferably greater than about 60 wt. %, 70 wt. %, 80 wt. %, 90 wt. %, 95 wt. %, 96 wt. %, 97 wt. %, 98 wt. %, 99 wt. %, or 99.5 wt. % silicon. The alloying element can be, for example, an alkali metal, an alkaline-earth metal, a Group 13 to 16 element, a transition metal group element, a rare earth group element, or a combination thereof, but, obviously, not Si. The alloying element can be, for example, Li, Na, Mg, Ca, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, B, Al, Ga, In, Ge, Sn, P, As, Sb, Bi, S, Se, Te, or a combination thereof. In one instance, the alloying element can be lithium, magnesium, aluminum, titanium, vanadium, chromium, manganese, iron, cobalt, nickel, copper, or a mixture thereof. In another instance, the alloying element can be selected from copper, silver, gold, or a mixture thereof. In still another instance, the silicon alloy can be selected from a SiTiNi alloy, a SiAlMn alloy, a SiAlFe alloy, a SiFeCu alloy, a SiCuMn alloy, a SiMgAl alloy, a SiMgCu alloy, or a combination thereof.

As the term alloy typically infers a homogeneous distribution of the alloying element(s) in the base material, silicon, the silicon nanoparticles can further include a heterogeneous distribution of alloying elements in the nanoparticles. In some instances, these alloy elements form intermetallics in the silicon nanoparticles. An intermetallic (also called an intermetallic compound, intermetallic alloy, ordered intermetallic alloy, and a long-range-ordered alloy) is an alloy that forms a solid-state compound exhibiting defined stoichiometry and ordered crystal structure; here, within the amorphous silicon nanoparticle composition (e.g., a NiSi intermetallic within Si).

The silicon nanoparticles, preferably, have an average diameter of less than about 1,000 nm, 900 nm, 800 nm, 700 nm, 600 nm, 500 nm, 400 nm, 300 nm, or 250 nm. In another instance, the silicon nanoparticles have an average diameter of from about 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 100 nm to about 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm. In specific instances, the silicon nanoparticles have an average diameter of about 50 nm to about 1,000 nm, about 50 nm to about 800 nm, about 50 nm to about 750 nm, about 50 nm to about 700 nm, about 50 nm to about 650 nm, about 50 nm to about 600 nm, about 50 nm to about 550 nm, about 50 nm to about 500 nm, about 50 nm to about 450 nm, about 50 nm to about 400 nm, about 50 nm to about 350 nm, about 50 nm to about 300 nm, about 100 nm to about 750 nm, about 100 nm to about 600 nm, about 100 nm to about 500 nm, about 100 nm to about 400 nm, or about 100 nm to about 300 nm. In one instance, silicon nanoparticles have a spherical morphology. In another instance, the silicon nanoparticles can have a plate-like morphology.

The solid-electrolyte phase, preferably, is a lithium ion conductor. The solid-electrolyte phase can be a sodium ion conductor. The solid-electrolyte phase can have a perovskite structure; an anti-perovskite structure; a NASICON-type structure; a garnet-like structure; an orthosilicate garnet structure; a thio-LISICON structure; an LGPS structure; an argyrodite structure; a layered sulfide structure; or a mixture thereof. As used herein, the solid-electrolyte phase is preferably composed, made of, consists essentially or, or consists of a perovskite structured material; an anti-perovskite structured material; a NASICON-type structured material; a garnet-like structured material; an orthosilicate garnet structured material; a thio-LISICON structured material; an LGPS structured material; an argyrodite structured material; a layered sulfide structured material; or a mixture thereof.

The solid-electrolyte phase can be interspersed though the porous particulate or can be in the form of discrete crystallites or nanorods, nanowires, or mixtures thereof. In one instance, the solid-electrolyte phase does not have a discrete form but is interspersed throughout the porous particulate. In another instance, the solid-electrolyte phase is nanowires or nanorods that extend though the porous particulate. Preferably, the solid-electrolyte phase is interconnected throughout the porous particulate.

Herein the solid-electrolyte phase is preferably a lithium metal sulfide, for example a lithium borosulfide, a lithium phosphosulfide. In this use, the "metal" can be a transition metal element and/or a main group element. Examples of lithium metal sulfide, solid-electrolyte phases include but are not limited to $Li_{4-x}M_{1-x}M'_xS_4$ wherein M is Si, Ge, or a mixture thereof, where M' is P, Al, Zn, Ga, or a mixture thereof, and where x is a value from about 0.1 to about 0.9; $Li_{10+x}(Sn_ySi_{1-y})_{1+x}P_{2-x}S_{12}$ where x is from about 0 to about 2, and wherein y is from about 0 to 1; $Li_6PS_5X$ where X is F, Cl, Br, I, or a mixture thereof; $Li_{6+x}P_{1-x}Si_xS_5Br$ where x is from about 0 to 1; $Li_{1+2x}Zn_{1-x}PS_4$, wherein x is from about 0 to 1; $Li_{7-x-2y}PS_{6-x-y}Cl_x$, where $0.8 \leq x \leq 1.7$ and $0 \leq y \leq -0.25x+0.5$; $Li_{7-x+y}PS_{6-x}Cl_{x+y}$, where $0.5 \leq y \leq 0.9$ and $-3.0x+1.8 \leq y \leq -3.0x+5.7$; $Li_{7-x}MS_{6-x}X_x$ where X is Cl or Br, M is P, B, or a mixture thereof, and x is 0.2 to 1.8; $Li_{3x}[Li_xSn_{1-x}S_2]$ where x is from about 0 to about 1; and $Li_{(12-n-x)}B^{n+}X_{6+x}Y^-_x$, where $B^{n+}$ is selected from the group consisting of P, As, Ge, Ga, Sb, Sn, Al, In, Ti, V, Nb and Ta; X is selected from the group consisting of S, Se and Te; and $Y^-$ is selected from the group consisting of Cl, Br, I, F, CN, OCN, SCN, and $N_3$, while $0 \leq x \leq 2$. Specific examples of lithium metal sulfide, solid-electrolyte phases include but are not limited to $Li_9B_{19}S_{33}$; $Li_5B_7S_{13}$; $Li_2B_2S_5$; $Li_3BS_3$; $Li_7P_3S_{11}$; $Li_3PS_4$; $Li[Li_{0.33}Sn_{0.67}S_2]$; $Li_{0.6}[Li_{0.2}Sn_{0.8}S_2]$; $Li_{11}Si_2PS_{12}$; $Li_{9.54}Si_{1.74}P_{1.44}S_{11.7}Cl_{0.3}$; $Li_{10}Si_{0.5}Ge_{0.5}P_2S_{12}$; $Li_{10}Sn_{0.5}Ge_{0.5}P_2S_{12}$; $Li_{10}Si_{0.5}Sn_{0.5}P_2S_{12}$; $Li_{10}GeP_2S_{11.7}O_{0.3}$; $Li_{9.6}P_3S_{12}$; $Li_9P_3S_9O_3$; $Li_{10.35}Ge_{1.35}P_{1.65}S_{12}$; $Li_{10.35}Si_{1.35}P_{1.65}S_{12}$; $Li_{9.81}Sn_{0.81}P_{2.19}S_{12}$; $Li_{9.42}Si_{1.02}P_{2.1}S_{9.96}O_{2.04}$; $Li_{10}GeP_2S_{12}$; $Li_{13}GeP_3S_{12}$; $Li_{10}SnP_2S_{12}$, or mixtures thereof. Particularly preferable lithium metal sulfide, solid-electrolyte phases include $Li_xM_yS_z$ where M includes B and/or P, where x, y, and z are positive integers; and $Li_{x'}M_{y'}S_{z'}R_{n'}$, where M includes B and/or P, where R is a halide, preferably selected from Cl and Br, and where x', y', z', and n' are positive integers.

In one embodiment, the process for the preparation of the above described porous particulates includes a porous microparticulate. The porous microparticulate can include about 5 wt. % to about 80 wt. % (dry basis) of a carbon matrix, about 5 wt. % to about 50 wt. % (dry basis) of a plurality of solid-electrolyte nanoparticles, and about 5 wt. % to about 90 wt. % (dry basis) of a plurality of silicon nanoparticles; wherein the porous microparticulate has an average diameter of about 1 μm to about 100 μm. This porous microparticulate can be provided by admixing the individual components, by the thermolysis of a mixture of an organic material, the solid-electrolyte nanoparticles, and the silicon nanoparticles; or any other method known in the art for the preparation of heterogeneous materials supported by a carbon matrix. Herewith, the solid-electrolyte nanoparticles can have a perovskite structure; an anti-perovskite structure; a NASICON-type structure; a garnet-like structure; an orthosilicate garnet structure; a thio-LISICON structure; an LGPS structure; an argyrodite structure; a layered sulfide structure; or a mixture thereof. As used herein, the solid-electrolyte nanoparticles are preferably composed, made of, consists essentially or, or consists of a perovskite structured material; an anti-perovskite structured material; a NASICON-type structured material; a garnet-like structured material; an orthosilicate garnet structured material; a thio-LISICON structured material; an LGPS structured material; an argyrodite structured material; a layered sulfide structured material; or a mixture thereof.

In one example, the solid-electrolyte nanoparticles have an average diameter of less than about 1,000 nm, 900 nm, 800 nm, 700 nm, 600 nm, 500 nm, 400 nm, 300 nm, 250 nm, 200 nm, 150 nm, 100 nm, or 50 nm. In another instance, the solid-electrolyte nanoparticles have an average diameter of from about 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 100 nm to about 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm. In specific instances, the solid-electrolyte nanoparticles have an average diameter of about 50 nm to about 1,000 nm, about 50 nm to about 800 nm, about 50 nm to about 750 nm, about 50 nm to about 700 nm, about 50 nm to about 650 nm, about 50 nm to about 600 nm, about 50 nm to about 550 nm, about 50 nm to about 500 nm, about 50 nm to about 450 nm, about 50 nm to about 400 nm, about 50 nm to about 350 nm, about 50 nm to about 300 nm, about 100 nm to about 750 nm, about 100 nm to about 600 nm, about 100 nm to about 500 nm, about 100 nm to about 400 nm, or about 100 nm to about 300 nm. In preferable instance, the average diameter of the solid-electrolyte nanoparticles is about the same as or is less than (smaller than) the average diameter of the silicon nanoparticles.

In a preferable embodiment, the herein disclosed process includes providing a porous microparticulate that has an average diameter of about 1 µm to about 100 µm, and includes about 5 wt. % to about 80 wt. % (dry basis) of a carbon matrix, about 5 wt. % to about 50 wt. % (dry basis) of a plurality of solid-sulfide-electrolyte nanoparticles, and about 5 wt. % to about 90 wt. % (dry basis) of a plurality of silicon nanoparticles. Thereafter the porous microparticulate can be admixed with a polysulfide solution thereby interconnecting the solid-sulfide-electrolyte nanoparticles and forming a solid-electrolyte phase. In one instance, forming the solid-electrolyte phase includes heating the interconnected solid-sulfide-electrolyte nanoparticles to a temperature of about 50° C. to about 600° C., about 50° C. to about 500° C., about 50° C. to about 450° C., about 75° C. to about 400° C., about 100° C. to about 400° C., about 100° C. to about 350° C., or about 100° C. to about 300° C. In another instance, forming the solid-electrolyte phase includes heating the admixture of the porous microparticulate and the polysulfide solution to a temperature of about 30° C. to a polysulfide solution solvent boiling point.

The polysulfide solution can include a polysulfide and a solvent. The polysulfide can be a lithium polysulfide, a sodium polysulfide, an ammonium polysulfide, an alkylammonium polysulfide, or a mixture thereof. The polysulfide is preferably a lithium polysulfide having the formula $Li_2S_x$ where x is in the range of 1 to about 12, preferably, 2 to about 6, or 2 to 4. The solvent, or polysulfide solution solvent, can be water (e.g., an ammonium hydroxide solution) or an ether, preferably, the solvent is an ether. The ether can be selected from tetrahydrofuran (THF), tetrahydropyran, 2,2,5,5-tetramethyl tetrahydrofuran, 2-methyl tetrahydrofuran, methyl t-butyl ether, ethyl t-butyl ether, 1,4-dioxane, 1,3-dioxane, dimethoxyethane, diisopropylether, dibutyl ether, diethyl ether, and mixtures thereof. In one preferable instance, the solvent is THF. In another preferable instance, the solvent is dimethoxyethane. In still another preferable instance, the solvent is 1,4-dioxane. In yet another preferable instance, the solvent is tetrahydropyran.

Herein, the solid-sulfide-electrolyte nanoparticles and the solid-electrolyte phase have approximately the same composition yet, preferably, the solid-electrolyte phase has a greater atom percentage of sulfur than the solid-sulfide-electrolyte nanoparticles. For example, solid-sulfide-electrolyte nanoparticles can have a formula of $Li_xM_yS_z$ where M includes B and/or P, where x, y, and z are positive integers, and have an electrolyte nanoparticle S to M ratio of z:y; the solid-electrolyte phase then can have a formula of $Li_{x'}M_{y'}S_{z'}$ where M includes B and/or P, and where x', y', and z' are positive integers, and has an electrolyte phase S to M ratio of z':y'. Preferably, the solid-electrolyte phase S to M ratio is greater (includes more sulfur) than the solid-sulfide-electrolyte nanoparticle S to M ratio.

The solid-sulfide-electrolyte nanoparticles and the solid-electrolyte phase can further feature a formula where M further includes As, Ge, Ga, Sb, Si, Sn, Al, In, Ti, V, Nb, Ta, and/or Zn. That is, in addition to B and/or P. Preferably, M includes Si, Sn, Ge, and/or Zn.

In another example, the solid-sulfide-electrolyte nanoparticles can have a formula of $Li_xM_ySR_n$, where M includes B and/or P, where R is a halide (e.g., Cl or Br), and where x, y, and z are positive integers, and have an electrolyte nanoparticle S to M ratio of z:y; the solid-electrolyte phase can then have a formula of $Li_{x'}M_{y'}S_{z'}R_{n'}$, where M includes B and/or P, where R is a halide (e.g., Cl or Br), and where x', y', z', and n' are positive integers, and has an electrolyte phase S to M ratio of z':y'. Preferably, the solid-electrolyte phase S to M ratio is greater (includes more sulfur) than the solid-sulfide-electrolyte nanoparticle S to M ratio.

Another embodiment of the herein disclosed process includes providing a porous microparticulate that has an average diameter of about 1 µm to about 100 µm, and includes about 5 wt. % to about 80 wt. % (dry basis) of a carbon matrix, about 5 wt. % to about 50 wt. % (dry basis) of a plurality of solid-sulfide-electrolyte nanoparticles, and about 5 wt. % to about 90 wt. % (dry basis) of a plurality of silicon nanoparticles. Thereafter the porous microparticulate can be admixed with a sulfide solution thereby interconnecting the solid-sulfide-electrolyte nanoparticles and forming a solid-electrolyte phase.

The sulfur solution, preferably, includes a sulfur compound and a solvent. The sulfur compound can be sulfur (elemental sulfur, e.g. $S_8$ or $S_7$), phosphorous pentasulfide ($P_2S_5$ or $P_4S_{10}$), boron sulfide ($B_2S_3$), or a mixture thereof. In one preferably instance, the sulfur compound is elemental sulfur. In another preferable instance, the sulfur compound is phosphorus pentasulfide when the solid-sulfide-electrolyte nanoparticles include lithium phosphorous sulfides; and is boron sulfide when the solid-sulfide-electrolyte nanoparticles include lithium boron sulfides. In yet another example, the sulfur compound can be phosphorus pentasulfide when the solid-sulfide-electrolyte nanoparticles include lithium boron sulfides; and can be boron sulfide when the solid-sulfide-electrolyte nanoparticles include lithium phosphorous sulfides.

The solvent in the sulfur solution is preferably one that can dissolve the sulfur compound. Accordingly, the solvent can be selected from carbon disulfide, pyridine, and a mixture thereof. In one preferable instance, the solvent is carbon disulfide. In another instance, wherein the sulfur compound is phosphorous pentasulfide and/or boron sulfide, the solvent can be pyridine.

Herein, the process of interconnecting the solid-sulfide-electrolyte nanoparticles and forming the solid-electrolyte phase can include heating the admixture of the porous microparticulate and the sulfur compound to a temperature in the range of about 50° C. to about 600° C., about 50° C. to about 500° C., about 50° C. to about 400° C., or about 100° C. to about 400° C. In one example, the admixture can include the solvent and the heating can be from about 30° C. to the boiling point of the solvent. In still another example, the solvent can be distilled from the admixture at a temperature between about 30° C. and the boiling point of the solvent and then the admixture further heated to a temperature up to about 300° C., 400° C., 500° C., or 600° C.

The process preferably includes forming a plurality of admixture microparticulates that individually include a carbon matrix precursor, a plurality of solid-sulfur-electrolyte nanoparticles, and a plurality of silicon nanoparticles, and then reducing the carbon matrix precursor to provide a carbon phase.

In one instance, the admixture microparticulates have an average diameter of about 1 µm to about 100 µm. Preferably, admixture microparticulates have an average diameter of about 2 µm to about 75 µm, about 3 µm to about 65 µm, about 4 µm to about 50 µm, about 5 m to about 30 µm, or about 5 µm to about 25 µm.

In another instance, the admixture microparticulates include about 5 wt. % to about 80 wt. % (dry basis) of a carbon matrix precursor. Preferably, the carbon matrix precursor is included in amounts of about 5 wt. % to about 80 wt. %, about 10 wt. % to about 75 wt. %, about 15 wt. % to about 65 wt. %, about 20 wt. % to about 60 wt. %, or about 25 wt. % to about 50 wt. % on a dry basis.

In yet another instance, the admixture microparticulates include about 5 wt. % to about 50 wt. % (dry basis) of a plurality of solid-sulfur-electrolyte nanoparticles. Preferably, the solid-electrolyte nanoparticles are included in amounts of about 10 wt. % to about 50 wt. %, about 15 wt. % to about 50 wt. %, about 20 wt. % to about 50 wt. %, or about 25 wt. % to about 50 wt. % on a dry basis.

In still another instance, the admixture microparticulates include about 5 wt. % to about 90 wt. % (dry basis) of a plurality of silicon nanoparticles. Preferably, the silicon nanoparticles are included in amounts of about 5 wt. % to about 85 wt. %, about 10 wt. % to about 80 wt. %, about 15 wt. % to about 75 wt. %, about 20 wt. % to about 75 wt. %, about 25 wt. % to about 75 wt. %, about 25 wt. % to about 70 wt. %, about 25 wt. % to about 65 wt. %, about 25 wt. % to about 60 wt. % on a dry basis.

In another instance, reducing the carbon matrix precursor and thereby forming a carbon matrix, decreases a carbon concentration in the microparticulate and provides a porosity to the porous particulate. In one example, reducing the carbon matrix precursor decreases a carbon concentration by about 25 wt. %, about 30 wt. %, about 35 wt. %, about 40 wt. %, about 45 wt. %, about 50 wt. %, or about 55 wt. % of the carbon matrix precursor. Reducing the carbon matrix precursor can include heating the carbon matrix precursor and/or an admixture that includes the carbon matrix precursor to a temperature in a range of about 400° C. to about 1500° C., about 500° C. to about 1200° C., about 600° C. to about 1000° C., or about 700° C. to about 1000° C. Furthermore, the reduction of the carbon matrix precursor can be undertaken under an inert (e.g., nitrogen or argon) gas or under a reducing gas or gas mixture (e.g., hydrogen, carbon monoxide, mixtures thereof with or without nitrogen and/or argon).

The plurality of admixture microparticulates can be formed by spray drying a slurry or solution of an admixture of the carbon matrix precursor, plurality of solid-sulfur-electrolyte nanoparticles, and plurality of silicon nanoparticles. In one instance, the admixture is spray dried from an organic solvent, e.g., pentane, hexane, heptane, octane, nonane, decane, acetone, methylethylketone, butanol, 1-propanol, 2-propanol, ethanol, methanol, benzene, toluene, xylene, acetonitrile, tetrahydrofuran, diethylether, methylethylether, or mixtures thereof.

In another example, the plurality of admixture microparticulates can be formed from a melt of an admixture of the carbon matrix precursor, plurality of solid-sulfur-electrolyte nanoparticles, and plurality of silicon nanoparticles. Herewith, the melt refers to the melting of the carbon matrix precursor.

A carbon matrix precursor is an organic compound that can be thermally processed to provide a carbon matrix; that is, the carbon matrix precursor is an organic compound that can be thermally reduced to provide reduced carbon. Examples of carbon matrix precursors include phenolic resin, pitch, polyacrylonitrile, poly(furfuryl alcohol), and mixtures thereof. Preferably, the carbon matrix precursor is solid at room temperature and pressure; more preferably, the carbon matrix precursor has a melting and/or softening point that is greater than 100° C., 150° C., 200° C., 250° C., or 300° C. Other examples of useful carbon material precursors include, coal tar pitch from soft pitch to hard pitch; coal-derived heavy oil such as dry-distilled liquefaction oil; petroleum-based heavy oils including directly distilled heavy oils such as atmospheric residue and vacuum residue, crude oil, and decomposed heavy oil such as ethylene tar produced during a thermal decomposition process of naphtha and so on; aromatic hydrocarbons such as acenaphthylene, decacyclene, anthracene and phenanthrene; polyphenylenes such as phenazine, biphenyl and terphenyl; polyvinyl chloride; water-soluble polymers such as polyvinyl alcohol, polyvinyl butyral and polyethylene glycol and insolubilized products thereof; nitrogen-containing polyacrylonitriles; organic polymers such as polypyrrole; organic polymers such as sulfur-containing polythiophene and polystyrene; natural polymers such as saccharides, e.g. glucose, fructose, lactose, maltose and sucrose; thermoplastic resins such as polyphenylene sulfide and polyphenylene oxide; thermosetting resins such as phenol-formaldehyde resin and imide resin; and mixtures thereof.

The process can further include preparing the solid-sulfur-electrolyte nanoparticles. In one instance, the solid-sulfur-electrolyte nanoparticles can be prepared by wet milling a solid-sulfur-electrolyte macroparticle. Examples of wet milling include processing the solid-sulfur-electrolyte macroparticles in the presence of a solvent with a comminution mill, a trituration mill, or another mill or device adapted to reduce the size of a macroparticle to a nanoparticle. Specific comminution mills include ball mills, bead mills, pin mills, hammer mills, roller mill, and/or jet mill.

The process can further include preparing the silicon nanoparticles. In one instance, the silicon nanoparticles can be prepared by wet milling a silicon feed. Examples of wet milling include processing the silicon feed in the presence of a solvent with a comminution mill, a trituration mill, or another mill or device adapted to reduce the size of a silicon feed to a silicon nanoparticle. Specific comminution mills include ball mills, bead mills, pin mills, hammer mills, roller mill, and/or jet mill.

In still another example, the process includes providing solid-sulfur-electrolyte nanoparticles which are solid-sulfur-electrolyte nanowires. In still yet another example, the admixture particulates further include about 1 wt. % to about 20 wt. % (dry basis) of a conductive agent, for example, where the conductive agent is a conductive carbon.

Yet another embodiment is a process of preparing a porous particulate for use in a lithium ion battery which includes forming a plurality of admixture microparticulates, and then crosslinking the carbon matrix precursor to provide a carbon phase. In this embodiment, the carbon matrix precursor is preferably a cross-linkable polymer or polymer precursor. In one instance, the carbon matrix precursor is a polyacrylonitrile; where the polyacrylonitrile is crosslinked by heating the admixture microparticulates to a temperature in a range of about 150° C. to about 350° C., that is, to a temperature to cross link the polyacrylonitrile but not convert the polymer to a reduced carbon. This embodiment can preferably include solid-sulfur-electrolyte nanoparticles which are solid-sulfur-electrolyte nanowires. Furthermore, the admixture particulates further include about 1 wt. % to about 20 wt. % (dry basis) of a conductive agent.

While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A porous microparticulate comprising:
   about 5 wt. % to about 80 wt. % dry basis of a carbon matrix,
   about 5 wt. % to about 50 wt. % dry basis of a plurality of solid-electrolyte nanoparticles, and
   about 5 wt. % to about 90 wt. % dry basis of a plurality of silicon nanoparticles;
   wherein the porous microparticulate has an average diameter of about 1 μm to about 100 μm.

2. A process of preparing a porous particulate for use in a lithium ion battery, the process comprising:
   providing a porous microparticulate, having an average diameter of about 1 m to about 100 μm, and including about 5 wt. % to about 80 wt. % dry basis of a carbon matrix, about 5 wt. % to about 50 wt. % dry basis of a plurality of solid-sulfide-electrolyte nanoparticles, and about 5 wt. % to about 90 wt. % dry basis of a plurality of silicon nanoparticles; and then
   admixing the porous microparticulate with a polysulfide solution thereby interconnecting the solid-sulfide-electrolyte nanoparticles and forming a solid-electrolyte phase.

3. The process of claim 2, wherein forming the solid-electrolyte phase includes heating the interconnected solid-sulfide-electrolyte nanoparticles to a temperature of about 50° C. to about 600° C.

4. The process of claim 2, wherein forming the solid-electrolyte phase includes heating the admixture of the porous microparticulate and the polysulfide solution to a temperature of about 30° C. to a polysulfide solution solvent boiling point.

5. The process of claim 2, the polysulfide solution includes a polysulfide and a solvent.

6. The process of claim 5, wherein the polysulfide is a lithium polysulfide having the formula $Li_2S_x$ where x is in the range of 1 to about 12.

7. The process of claim 5, wherein the solvent is an ether.

8. The process of claim 7, wherein the ether is selected from tetrahydrofuran (THF), tetrahydropyran, 2,2,5,5-tetramethyl tetrahydrofuran, 2-methyl tetrahydrofuran, methyl t-butyl ether, ethyl t-butyl ether, 1,4-dioxane, 1,3-dioxane, dimethoxyethane, diisopropylether, dibutyl ether, diethyl ether, and mixtures thereof.

9. The process of claim 2, wherein solid-sulfide-electrolyte nanoparticles have a formula of $Li_xM_yS_z$ where M includes B and/or P, where x, y, and z are positive integers, and have an electrolyte nanoparticle S to M ratio of z:y; and
   wherein the solid-electrolyte phase has a formula of $Li_{x'}M_{y'}S_{z'}$, where M includes B and/or P, and where x', y', and z' are positive integers, and has an electrolyte phase S to M ratio of z':y';
   wherein the electrolyte phase S to M ratio is greater than the electrolyte nanoparticle S to M ratio.

10. The process of claim 9, wherein M further includes As, Ge, Ga, Sb, Si, Sn, Al, In, Ti, V, Nb, Ta, and/or Zn.

11. The process of claim 10, wherein M includes Si, Sn, Ge, and/or Zn.

12. The process of claim 2, wherein solid-sulfide-electrolyte nanoparticles have a formula of $Li_xM_yS_zR_n$, where M includes B and/or P, where R is a halide, and where x, y, and z are positive integers, and have an electrolyte nanoparticle S to M ratio of z:y; and
   wherein the solid-electrolyte phase has a formula of $Li_{x'}M_{y'}S_{z'}R_{n'}$, where M includes B and/or P, where R is a halide, and where x', y', z', and n' are positive integers, and has an electrolyte phase S to M ratio of z':y'; and
   wherein the electrolyte phase S to M ratio is greater than the electrolyte nanoparticle S to M ratio.

13. The process of claim 2, wherein the porous microparticulate is provided by
   forming a plurality of admixture microparticulates, having an average diameter of about 1 μm to about 100 μm, the admixture microparticulates include about 5 wt. % to about 80 wt. % dry basis of the carbon matrix precursor, about 5 wt. % to about 50 wt. % dry basis of the plurality of solid-electrolyte nanoparticles, and about 5 wt. % to about 90 wt. % dry basis of the plurality of silicon nanoparticles; and then
   reducing the carbon matrix precursor to form the carbon matrix.

14. The process of claim 13, wherein the admixture microparticulates are formed by a spray drying process.

15. The process of claim 2, wherein the porous microparticulate is provided by forming a plurality of admixture microparticulates, having an average diameter of about 1 μm to about 100 μm, the admixture microparticulates include about 5 wt. % to about 80 wt dry basis of the carbon matrix precursor, about 5 wt. % to about 50 wt. % dry basis of the plurality of solid-electrolyte nanoparticles, and about 5 wt. % to about 90 wt. % dry basis of the plurality of silicon nanoparticles; and then
   crosslinking the carbon matrix precursor to provide the carbon matrix.

16. The process of claim 2, wherein the porous microparticulate further include about 1 wt. % to about 20 wt. % dry basis of a conductive agent.

17. The process of claim 16, wherein the conductive agent is a conductive carbon.

18. A process of preparing a porous particulate for use in a lithium ion battery, the process comprising:
   providing a porous microparticulate, having an average diameter of about 1 m to about 100 μm, and including about 5 wt. % to about 80 wt. % dry basis of a carbon matrix, about 5 wt. % to about 50 wt. % dry basis of a plurality of solid-sulfide-electrolyte nanoparticles, and about 5 wt. % to about 90 wt. % dry basis of a plurality of silicon nanoparticles; and then
   admixing the porous microparticulate with a sulfur solution thereby interconnecting the solid-sulfide-electrolyte nanoparticles and forming a solid-electrolyte phase.

19. The process of claim 18, wherein the sulfur solution includes a sulfur compound and a solvent;
   wherein the sulfur compound is selected from sulfur, phosphorous pentasulfide, boron sulfide, and a mixture thereof; and
   wherein the solvent is selected from carbon disulfide, pyridine, and a mixture thereof.

20. The process of claim 19, wherein interconnecting the solid-sulfide-electrolyte nanoparticles and forming the solid-electrolyte phase includes heating the admixture of the porous microparticulate and the sulfur compound to a temperature in the range of about 50° C. to about 500° C.

21. The process of claim 19, wherein the sulfur solution includes sulfur and carbon disulfide.

22. The process of claim 19, wherein the sulfur solution includes phosphorous pentasulfide and carbon disulfide and/or pyridine.

23. The process of claim 19, wherein the sulfur solution includes boron sulfide and pyridine.

* * * * *